(12) United States Patent
Henze et al.

(10) Patent No.: US 11,155,709 B2
(45) Date of Patent: Oct. 26, 2021

(54) METHOD FOR PRODUCING THERMOPLASTIC POLYURETHANES

(71) Applicant: BASF SE, Ludwigshafen am Rhein (DE)

(72) Inventors: Oliver Steffen Henze, Lemfoerde (DE); Dirk Kempfert, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 1 day.

(21) Appl. No.: 15/772,947

(22) PCT Filed: Oct. 14, 2016

(86) PCT No.: PCT/EP2016/074721
§ 371 (c)(1),
(2) Date: May 2, 2018

(87) PCT Pub. No.: WO2017/076609
PCT Pub. Date: May 11, 2017

(65) Prior Publication Data
US 2018/0319981 A1    Nov. 8, 2018

(30) Foreign Application Priority Data
Nov. 4, 2015   (EP) ..................................... 15192927

(51) Int. Cl.
| | |
|---|---|
| C08G 18/08 | (2006.01) |
| B29B 9/06 | (2006.01) |
| C08L 75/04 | (2006.01) |
| C08G 18/75 | (2006.01) |
| C08G 18/22 | (2006.01) |
| C08G 18/32 | (2006.01) |
| C08G 18/48 | (2006.01) |
| C08G 18/66 | (2006.01) |

(52) U.S. Cl.
CPC ............. C08L 75/04 (2013.01); B29B 9/065 (2013.01); C08G 18/0895 (2013.01); C08G 18/227 (2013.01); C08G 18/3206 (2013.01); C08G 18/4854 (2013.01); C08G 18/6674 (2013.01); C08G 18/758 (2013.01); *C08L 2203/16* (2013.01)

(58) Field of Classification Search
CPC ............. C08G 18/0895; C08G 18/227; C08G 18/3206; C08G 18/758; B29B 9/065
See application file for complete search history.

(56) References Cited

U.S. PATENT DOCUMENTS

| | | |
|---|---|---|
| 5,824,738 A | 10/1998 | Humphrey et al. |
| 6,187,859 B1 | 2/2001 | Humphrey et al. |
| 2004/0102599 A1 | 5/2004 | Kaufhold et al. |
| 2005/0151291 A1 | 7/2005 | Dejolier |
| 2010/0007039 A1* | 1/2010 | Selbertinger .......... C08Q 18/61 264/142 |
| 2011/0077346 A1 | 3/2011 | Humphrey et al. |
| 2011/0105673 A1 | 5/2011 | Humphrey et al. |
| 2011/0135899 A1* | 6/2011 | Meltzer ................. B32B 27/12 428/217 |
| 2011/0177344 A1 | 7/2011 | Humphrey et al. |
| 2016/0304659 A1* | 10/2016 | Prissok .............. C08G 18/4808 |

FOREIGN PATENT DOCUMENTS

| | | | |
|---|---|---|---|
| DE | 695 16 978 T2 | 12/2000 | |
| EP | 1 422 259 A1 | 5/2004 | |
| EP | 1 213 307 B1 | 4/2006 | |
| EP | 1 846 465 B1 | 3/2009 | |
| WO | WO 2009/023131 A2 | 2/2000 | |
| WO | WO-0017249 * | 3/2000 | ............. C08G 18/10 |
| WO | WO 03/099875 A2 | 12/2003 | |
| WO | WO 2015/063062 A1 | 5/2015 | |
| WO | WO-2015063062 A1 * | 5/2015 | ........... C08G 18/244 |

OTHER PUBLICATIONS

International Preliminary Report on Patentability dated May 11, 2018 in PCT/EP2016/074721 filed Oct. 14, 2016, (with English translation), 22 pages.
International Search Report dated Jan. 18, 2017, in PCT/EP2016/074721, filed Oct. 14, 2016.
Guhl, D. et al., "Alternatives to DBTL catalysts in polyurethanes—a comparative study", https://www.researchgate.net/profile/Dieter_Guhl2/publication/264934332_Alternatives_to_DBTL_catalysts_in_polyurethanes_-_a_comparative_study, [retrieved Feb. 11, 2016], XP 055249182, Aug. 21, 2014, 17 pages.
Dr. R. Vieweg, et al., "Polyurethane", Kunststoff-Handbuch, Band VII, 1966, 14 pages.

* cited by examiner

*Primary Examiner* — Michael L Leonard
(74) *Attorney, Agent, or Firm* — Grüneberg and Myers PLLC

(57) ABSTRACT

The present invention relates to a method for producing a thermoplastic polyurethane that comprises reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt and producing pellets from the resulting melt. The present invention further relates to a thermoplastic polyurethane obtained or obtainable by the method of the invention, and also to the use for producing films, profiles, cable sheathing, and sheathing of LED strips.

16 Claims, No Drawings

METHOD FOR PRODUCING THERMOPLASTIC POLYURETHANES

This application is a National Stage of PCT/EP2016/074721, which was filed on Oct. 14, 2016. This application is based upon and claims the benefit of priority to European Application No. 15192927.0, which was filed on Nov. 4, 2015.

The present invention relates to a method for producing a thermoplastic polyurethane that comprises reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt and producing pellets from the resulting melt. The present invention further relates to a thermoplastic polyurethane obtained or obtainable by the method of the invention, and also to the use for producing films, profiles, cable sheathing, and sheathing of LED strips.

Thermoplastic polyurethanes, also identified below as TPUs, and methods for producing them are common knowledge and have been diversely described.

Thermoplastic polyurethanes based on aliphatic isocyanates, in particular, have the advantage of particularly good lighfastness. These aliphatic thermoplastic polyurethanes, as they are termed, are increasingly finding application to the production of light-stable and colorfast moldings such as, for example, injection moldings of any form, films, tubing, cables, or sintered foils such as surfaces of instrument panels, for instance.

Thermoplastic polyurethanes based on H12MDI are also impressive for their high transparency in conjunction with very good mechanical qualities and also extremely low yellowing tendency. These materials, consequently, are often processed to films and applied as protective film to a variety of other materials. Areas for use of these films include protection against stone chipping or else coating for laminate. A further sphere for application of such films is in transparent multilayer composites. In this context the films serve for the bonding of, for example, glass to polycarbonate layers in order to produce, for example, bulletproof glass.

The production of these H12MDI-based thermoplastic polyurethanes is also state of the art. In view of the tardiness of H12MDI to react, the materials are frequently produced in a discontinuous casting process, and, after the reaction is concluded, the cast blocks are usefully comminuted. The two-stage nature of the process is a disadvantage here.

Also known per se is the continuous production involving a reactive extruder and subsequent underwater pelletizing. This production process is advantageous for its single-stage nature and the associated cost reduction relative to multistage processes.

Here, nevertheless, the residence times of the individual reactants in the extruder are frequently insufficient, with the result that, while the melt obtained is pelletizable, the polymer reaction cannot be concluded. The resulting melt then includes alcohols and also isocyanates that are still unreacted. During underwater pelletizing, this melt then undergoes sudden cooling, meaning that a continued reaction of the alcohols and isocyanates at room temperature proceeds only very slowly.

Because of the incomplete reaction, the resulting thermoplastic polyurethane has a low molecular weight, and the pellets tend to form agglomerates and, generally, to suffer from sticking. This leads to problems associated with the conveying and storage of the pellets.

Another consequence of the incomplete reaction is that the pellets obtained have to be stored. Because of the physical properties, storing them at elevated temperatures leads to sticking, and so the resulting thermoplastic polyurethane must be stored for a long time at low temperatures until the molecular weight reaches a level sufficient for continued processing.

For the one-stage production processes it is usual to use catalysts in order to shorten the reaction times of the reactants. Widespread in this context are organotin compounds such as dibutyltin dilaurate, for example. The organotin compounds, however, are toxic, and there are many areas of application in which they cannot be used.

One alternative to the organotin catalysts are tin salts, such as tin dioctoate, for example. These catalysts, though highly efficient, lose their reactivity on contact with water. In the underwater pelletizing of a TPU melt (as targeted by the continuous process), a large part of the tin salt is precipitated in the form of unreactive tin dioxide, thereby preventing continued, catalyzed reaction after pelletizing.

Also employed are catalysts based on iron (e.g., Fe acetylacetonates) or on titanium (e.g., titanium orthotitanate), but such catalysts often lead to high degrees of initial yellowness on the part of the resulting thermoplastic polyurethane. Likewise known are catalysts based on potassium, zirconium, zinc or aluminum, and also amine catalysts.

The present invention, then, was based on an object of providing a method for producing a thermoplastic polyurethane, based on H12MDI, that allows the thermoplastic polyurethane to be produced continuously in a simple way. Moreover, the method ought to be carried out using reactive, nontoxic catalysts. A further object was to provide thermoplastic polyurethanes based on H12MDI that exhibit a reduced sticking tendency and, preferably, a low degree of yellowness.

In accordance with the invention this object is achieved by means of a method for producing a thermoplastic polyurethane, comprising the following steps:
  (i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
  (ii) producing pellets from the melt obtained as per step (i).

In particular this object is achieved by means of a method for producing a thermoplastic polyurethane, comprising the following steps:
  (i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
  (ii) producing pellets from the melt obtained as per step (i);
  (iii) storing the pellets obtained as per step (ii);
  where reaction continues during the storage as per step (iii).

It has surprisingly been found that with the method of the invention it is possible to produce thermoplastic polyurethanes based on H12MDI simply and that the products obtained have low degrees of yellowness. Through the use of bismuth (tricarboxylate) catalysts, in which the carboxyl radicals independently of one another have 6 to 12 carbon atoms, it has been possible, surprisingly, to obtain thermoplastic polyurethanes having high molecular weights and low degrees of yellowness. It has surprisingly been found that the bismuth catalysts used remain stable even after production of the pellets from the melt, and that continued reaction in the pellets is possible.

The method of the invention comprises steps (i) and (ii). According to step (i), an isocyanate composition at least comprising 4,4'-diisocyanatodicyclohexylmethane (H12MDI) is reacted with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt. According to step (ii), pellets are produced from the melt obtained as per step (i). The method of the invention may comprise further steps, such as storage or temperature adaptation, for example.

The method of the invention may in particular comprise storage steps and/or heating steps. The heating may take place, for example, at temperatures in the range from 30 to 40° C.

According to a further embodiment, the method of the invention may comprise a step (iii):

(iii) storing the pellets obtained as per step (ii).

The present invention therefore also relates to a method for producing a thermoplastic polyurethane, comprising the following steps:

(i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;

(ii) producing pellets from the melt obtained as per step (i);

(iii) storing the pellets obtained as per step (ii).

After the storage of the pellets obtained as per step (ii), the product is preferably pellets of higher molecular weight; in other words, there is preferably a continued reaction during the storage as per step (iii).

In accordance with the invention the storage may take place, for example, at a temperature in the range from 20 to 40° C. This storage may take place for a time in the range from 1 to 100 days, as for example for a time in the range from 60 to 90 days.

In the context of the present invention it is also possible for the storage as per step (iii) to take place at an elevated temperature, as for example at a temperature in the range from 50 to 90° C. In the context of this embodiment, the storage takes place, for example, for a time in the range from 5 to 48 hours.

The isocyanate composition used in accordance with the invention comprises at least 4,4'-diisocyanatodicyclohexylmethane (H12MDI). In the context of the present invention it is also possible to use further aliphatic isocyanates, especially diisocyanates.

Aliphatic diisocyanates used may be aliphatic and/or cycloaliphatic diisocyanates, as for example tri-, tetra-, penta-, hexa-, hepta- and/or octamethylene diisocyanate, 2-methyl-pentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, 4,4'-, 2,4'- and/or 2,2'-dicyclohexylmethane diisocyanate. Preference is given to using hexamethylene 1,6-diisocyanate (hexamethylene diisocyanate, HDI) as further aliphatic diisocyanate.

In the context of the present invention there is preferably no isocyanate used other than H12MDI.

According to step (i), the isocyanate composition is reacted with a polyol composition (PZ). This polyol composition in the context of the present invention comprises one or more polyols. Customary polyols are known to the skilled person. Polyols which can be used in the context of the present invention are, in particular, well-known polyhydroxyl compounds having molecular weights of 500 to 8000, preferably 600 to 6000, more particularly 800 to 4000, and having preferably an average functionality of 1.8 to 2.6, more preferably 1.9 to 2.2, more particularly 2, examples being polyesterols, polyetherols and/or polycarbonate diols.

According to one further embodiment, therefore, the present invention relates to a method for producing a thermoplastic polyurethane, as described above, wherein the polyol composition (PZ) comprises at least one polyol selected from the group consisting of polycarbonate diols, polyethers, and polyesters.

Suitable polyethers and polyesters are known fundamentally to the skilled person.

Preferred for use as polyester diols are compounds obtainable by reaction of butanediol and hexanediol as diols with adipic acid as dicarboxylic acid. Suitable polyester diols have a molecular weight, for example, in the range from 600 to 4000 g/mol, preferably 800 to 2500 g/mol, more preferably 1800 to 2200 g/mol.

According to one embodiment of the present invention, a polycarbonate diol or a polytetrahydrofuran polyol is used. Suitable polytetrahydrofuran polyols have a molecular weight, for example, in the range from 500 to 5000 g/mol, preferably 500 to 2000 g/mol, more preferably 800 to 1200 g/mol.

Examples of suitable polycarbonate diols are polycarbonate diols based on alkanediols. Suitable polycarbonate diols are strictly difunctional OH-functional polycarbonate diols, preferably strictly difunctional OH-functional aliphatic polycarbonate diols. Suitable polycarbonate diols are based, for example, on 1,4-butanediol, 1,5-pentanediol or 1,6-hexanediol, especially 1,4-butanediol, 1,5-pentanediol, 1,6-hexanediol, 3-methylpentane-1,5-diol or mixtures thereof, more preferably 1,4-butanediol, 1,5-pentanediol, 1,6-hexanediol or mixtures thereof. In the context of the present invention, preference is given to using polycarbonate diols based on 1,4-butanediol and 1,6-hexanediol, polycarbonate diols based on 1,5-pentanediol and 1,6-hexanediol, polycarbonate diols based on 1,6-hexanediol, and mixtures of two or more of these polycarbonate diols.

The polycarbonate diols used preferably have a number-average molecular weight Mn in the range from 500 to 4000 g/mol, determined via GPC, more preferably in the range from 650 to 3500 g/mol, determined via GPC, very preferably in the range from 800 to 3000 g/mol, determined via GPC.

In the context of the present invention, the polyol composition (PZ) may comprise further polyols, including chain extenders, for example.

Chain extenders used may preferably be aliphatic, araliphatic, aromatic and/or cycloaliphatic compounds having a molecular weight of 0.05 kg/mol to 0.499 kg/mol, preferably difunctional compounds, examples being diamines and/or alkanediols having 2 to 10 carbon atoms in the alkylene radical, di-, tri-, tetra-, penta-, hexa-, hepta-, octa-, nona- and/or decaalkylene glycols having 3 to 8 carbon atoms, especially 1,2-ethylene glycol, 1,3-propanediol, 1,4-butanediol, 1,6-hexanediol, preferably corresponding oligopropylene and/or polypropylene glycols, and mixtures of the chain extenders can also be used. The chain extenders used preferably have only primary hydroxyl groups; 1,4-butanediol is especially preferred.

According to a further embodiment, therefore, the present invention relates to a method for producing a thermoplastic polyurethane as described above, wherein the polyol composition (PZ) comprises at least one chain extender selected from the group consisting of diols having 2 to 6 carbon atoms. More particularly the present invention relates to a method for producing a thermoplastic polyurethane as described above, wherein the polyol composition (PZ) comprises 1,4-butanediol as chain extender.

To adjust the hardness of the thermoplastic polyurethanes it is possible to vary the amounts of the synthesis components used within relatively broad molar ratios, with the hardness customarily increasing as the amount of chain extender goes up. The mixing ratio of the components used is preferably adjusted so as to give a thermoplastic polyurethane having a Shore hardness in the range from 60 A to 60 D, determined as per DIN 53505, as for example in the range from 70 A to 100 A, determined as per DIN 53505, preferably having a Shore hardness in the range from 70 A to 98 A, determined as per DIN 53505, more preferably having a Shore hardness in the range from 70 A to 90 A, determined as per DIN 53505.

According to one further embodiment, therefore, the present invention relates to a composition as described above, wherein the thermoplastic polyurethane has a Shore hardness in the range from 60 A to 100 A, determined as per DIN 53505.

To produce the thermoplastic polyurethanes of the invention, the isocyanate composition and the polyol composition (PZ) are reacted in the presence of catalysts and optionally auxiliaries and/or adjuvants in amounts such that the equivalence ratio of NCO groups in the isocyanates to the sum total of the hydroxyl groups in the polyols used is 0.9 to 1.1:1, preferably 0.98 to 1.02:1, and more particularly approximately 0.99 to 1.01:1.

Used according to step (i) is a catalyst composition at least comprising a bismuth-containing compound selected from bismuth (tricarboxylate) catalysts, where the carboxyl radicals independently of one another have 6 to 12 carbon atoms. In the context of the present invention, this catalyst composition may also comprise two or more bismuth compounds selected from bismuth (tricarboxylate) catalysts, where the carboxyl radicals independently of one another have 6 to 12 carbon atoms.

In accordance with the invention the amount of catalyst used may vary within broad ranges. Suitable amounts are situated, for example, in the range from 50 to 600 ppm, preferably in the range from 100 to 500 ppm, more preferably in the range from 200 to 400 ppm, based in each case on the total amount of the components used.

According to a further embodiment, therefore, the present invention relates to a method for producing a thermoplastic polyurethane, as described above, wherein the catalyst composition is used in an amount in the range from 50 to 600 ppm, based on the total amount of the components used.

Suitable bismuth compounds are, in particular, bismuth tri(2-ethylhexanoate), bismuth octoate and/or bismuth neodecanoate. Preference in accordance with the invention is given to bismuth tri(2-ethylhexanoate), and/or bismuth neodecanoate, more preferably bismuth neodecanoate.

According to one further embodiment, therefore, the present invention relates to a method for producing a thermoplastic polyurethane, as described above, wherein the catalyst composition comprises bismuth neodecanoate.

Besides catalysts, there are also customary auxiliaries that can be added in the case of the reaction as per step (i). Examples include surface-active substances, fillers, further flame retardants, nucleating agents, oxidation stabilizers, lubricants and mold release assistants, dyes and pigments, optionally stabilizers, to counter hydrolysis, light, heat or discoloration, for example; organic and/or inorganic fillers, reinforcing agents, and plasticizers. Suitable auxiliaries and adjuvants may be found in, for example, Kunststoffhandbuch, volume VII, edited by Vieweg and Höchtlen, Carl Hanser Verlag, Munich 1966 (pp. 103-113).

The method of the invention encompasses steps (i) and (ii). According to step (i), the isocyanate composition is reacted with the polyol composition (PZ) in the presence of the catalyst composition to give a melt. In the context of the present invention, all suitable methods can be employed, wherein the components can be reacted to give a melt. Hence the reaction may take place, for example, at an elevated temperature to give a melt. In this case it is advantageous if the components are well distributed. A homogeneous distribution can be accomplished, for example, in an extruder, preferably in a twin-screw extruder.

Especially suitable, therefore, are methods carried out in an extruder. Suitable extruders are known fundamentally to the skilled person.

In the case of what are called reactive extruder methods, for example, the synthesis components and the catalyst composition are introduced individually or as a mixture into the extruder and are brought to reaction at temperatures, for example, of 100° C. to 250° C., preferably 140° C. to 220° C. The resulting thermoplastic polyurethane is extruded.

According to one further embodiment, the present invention thus relates to a method for producing a thermoplastic polyurethane, as described above, wherein the reaction as per step (i) takes place in an extruder.

Suitable conditions for the reaction in the extruder are known per se to the skilled person.

According to one further embodiment, therefore, the present invention relates to a method for producing a thermoplastic polyurethane, as described above, wherein the residence time in the extruder is selected such that a conversion of at least 98% is achieved.

The residence time in the extruder is typically at least 40 seconds, preferably at least 60 seconds. Customarily the residence time in the extruder is not more than 300 seconds.

The conditions in the extruder are typically selected such that the thermoplastic polyurethane has a viscosity which permits underwater pelletization. Suitable viscosities are situated for example in the range from 50 Pas to 150 Pas, preferably in the range from 60 Pas to 120 Pas, more preferably in the range from 70 Pas to 110 Pas.

The method of the invention further comprises step (ii). According to step (ii), pellets are produced from the melt obtained as per step (i). In the context of the present invention it is possible here to use all suitable methods for producing pellets from the melt. Suitable methods are known per se to the skilled person. Having proven advantageous in the context of the present invention is underwater pelletizing or strand pelletizing. It is advantageous here that the catalysts used remain active on contact with water, allowing a catalytically accelerated continued reaction to take place in the resulting pellets as well.

According to one further embodiment, therefore, the present invention relates to a method for producing a thermoplastic polyurethane, as described above, wherein the production as per step (ii) takes place by means of underwater pelletizing or strand pelletizing.

In accordance with the invention the thermoplastic polyurethane is obtained in the form of pellets. The thermoplastic polyurethane in this case has low degrees of yellowing, corresponding for example to yellowness indices of less than 20 YI, preferably of less than 18 YI, more preferably of less than 15 YI. The yellowness index is determined in accordance with ASTM E 313.

In accordance with the invention the thermoplastic polyurethane obtained is more particularly one which has a molecular weight in the range from 70 000 to 100 000, preferably in the range from 80 000 to 100 000, more preferably in the range from 85 000 to 100 000. Unless otherwise indicated, the molecular weight determination in the context of the present invention is made in accordance with the description given in the Examples section.

According to a further aspect, the present invention also relates to a thermoplastic polyurethane obtained or obtainable by a method as described above.

According to a further aspect, consequently, the present invention relates to a thermoplastic polyurethane obtained or obtainable by a method for producing a thermoplastic polyurethane that comprises the following steps:
(i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
(ii) producing pellets from the melt obtained as per step (i).

The present invention further relates to a thermoplastic polyurethane obtained or obtainable by a method for producing a thermoplastic polyurethane that comprises the following steps:
(i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
(ii) producing pellets from the melt obtained as per step (i);
(iii) storing the pellets obtained as per step (ii).

The thermoplastic polyurethane obtained in accordance with the invention customarily comprises residues of the bismuth catalyst used in the method.

The present invention therefore also relates to a thermoplastic polyurethane based on an isocyanate composition at least comprising 4,4'-diisocyanatodicyclohexylmethane (H12MDI) and on a polyol composition (PZ) at least comprising a polyol and a chain extender selected from the group consisting of diols having 2 to 6 carbon atoms, wherein the thermoplastic polyurethane has a bismuth content in the range from 1 to 200 ppm.

The thermoplastic polyurethane preferably has a bismuth content in the range from 1 to 200 ppm, more preferably in the range from 10 to 170 ppm, very preferably in the range from 50 to 110 ppm, based in each case on the thermoplastic polyurethane.

With regard to the preferred embodiments, reference is made to the observations above concerning the method.

According to one further embodiment, therefore, the present invention relates to a thermoplastic polyurethane as described above, wherein the isocyanate composition comprises no isocyanate other than H12MDI.

The polyol composition preferably comprises at least one polyol selected from the group consisting of polycarbonate diols, polyethers, and polyesters. Accordingly, the present invention also relates to a thermoplastic polyurethane as described above, wherein the polyol composition (PZ) comprises at least one polyol selected from the group consisting of polycarbonate diols, polyethers, and polyesters. Examples of polyethers which can be used include polytetrahydrofurans. Suitable polytetrahydrofuran polyols have, for example, a molecular weight in the range from 500 to 5000 g/mol, preferably 500 to 2000 g/mol, more preferably 800 to 1200 g/mol. Preferred for use as polyester diols are compounds which are obtainable by reaction of butanediol and hexanediol as diols with adipic acid as dicarboxylic acid. Suitable polyester diols have a molecular weight, for example, in the range from 600 to 4000 g/mol, preferably 800 to 2500 g/mol, more preferably 1800 to 2200 g/mol.

The polyol composition (PZ) further preferably comprises 1,4-butanediol as chain extender.

The thermoplastic polyurethanes of the invention preferably have a Shore hardness in the range from 60 A to 60 D, determined as per DIN 53505, as for example in the range from 70 A to 100 A, determined as per DIN 53505, more preferably a Shore hardness in the range from 70 A to 98 A, determined as per DIN 53505, and more preferably still a Shore hardness in the range from 70 A to 90 A, determined as per DIN 53505.

The thermoplastic polyurethanes obtained in accordance with the invention are suitable for a multiplicity of applications. Processing of the inventively produced thermoplastic polyurethanes into the desired plastics parts or films may be accomplished, for example, by well-known extrusion, by customary injection molding, or else by other methods known per se.

The thermoplastic polyurethanes obtained have high lightfastness and low yellowness indices. They are therefore especially suitable for producing extruded products, as for example in the production of light-conducting films, profiles, cables, and also sheathing on LED strips, films for protection from stone chipping, or else coatings on laminate.

The present invention therefore also relates to the use of a thermoplastic polyurethane obtained or obtainable by a method as described above, or of a thermoplastic polyurethane as described above, for producing films, profiles, cable sheathing, and sheathing of LED strips.

Further embodiments of the present invention are apparent from the claims and the examples. It will be appreciated that the features of the subject matter/method of the invention and, respectively, of the uses in accordance with the invention that are stated above and elucidated hereinafter can be used not only in the particular combination indicated but also in other combinations without departing from the scope of the invention. Hence, for example, the combination of a preferred feature with a particularly preferred feature, or of an otherwise uncharacterized feature with a particularly preferred feature, etc., is also implicitly included, even if that combination is not expressly mentioned.

Listed below are exemplary embodiments of the present invention that do not restrict the present invention. In particular, the present invention also encompasses those embodiments arising from the dependency references, and therefore combinations, indicated below.

1. A method for producing a thermoplastic polyurethane, comprising the following steps:
   (i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
   (ii) producing pellets from the melt obtained as per step (i).
2. The method according to embodiment 1, wherein the polyol composition (PZ) comprises at least one polyol selected from the group consisting of polycarbonate diols, polyethers, and polyesters.
3. The method according to either of embodiments 1 and 2, wherein the polyol composition (PZ) comprises at least one chain extender selected from the group consisting of diols having 2 to 6 carbon atoms.
4. The method according to any of embodiments 1 to 3, wherein the catalyst composition is used in an amount of 50 to 600 ppm, based on the total amount of the components used.
5. The method according to any of embodiments 1 to 4, wherein the catalyst composition comprises bismuth neodecanoate.
6. The method according to any of embodiments 1 to 5, wherein the reaction as per step (i) takes place in an extruder.
7. The method according to any of embodiments 1 to 6, wherein the residence time in the extruder is selected such that a conversion of at least 98% is achieved.
8. The method according to any of embodiments 1 to 7, wherein the production as per step (ii) takes place by means of underwater pelletizing or strand pelletizing.
9. The method according to any of embodiments 1 to 8, wherein the method comprises a step (iii):
   (iii) storing the pellets obtained as per step (ii).
10. A method for producing a thermoplastic polyurethane, comprising the following steps:
    (i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
    (ii) producing pellets from the melt obtained as per step (i);
    (iii) storing the pellets obtained as per step (ii).
11. A thermoplastic polyurethane based on an isocyanate composition at least comprising 4,4'-diisocyanatodicyclohexylmethane (H12MDI) and on a polyol composition (PZ) at least comprising a polyol and a chain extender selected from the group consisting of diols having 2 to 6 carbon atoms,
    where the thermoplastic polyurethane has a bismuth content in the range from 1 to 100 ppm.
12. The thermoplastic polyurethane according to embodiment 11, wherein the isocyanate composition comprises no isocyanate other than H12MDI.
13. The thermoplastic polyurethane according to embodiment 11 or 12, wherein the polyol composition (PZ) comprises at least one polyol selected from the group consisting of polycarbonate diols, polyethers, and polyesters.
14. The thermoplastic polyurethane according to any of embodiments 11 to 13, wherein the polyol composition (PZ) comprises at least one chain extender selected from the group consisting of diols having 2 to 6 carbon atoms.
15. The thermoplastic polyurethane according to any of embodiments 11 to 14, wherein the polyol composition (PZ) comprises butanediol as chain extender.
16. The thermoplastic polyurethane according to any of embodiments 11 to 15, wherein the thermoplastic polyurethane has a Shore hardness in the range from 60 A to 60 D, determined as per DIN 53505.
17. The thermoplastic polyurethane according to any of embodiments 11 to 16, wherein the thermoplastic polyurethane has a molecular weight in the range from 70 000 to 100 000.
18. A thermoplastic polyurethane obtained or obtainable by a method according to any of embodiments 1 to 10.
19. A thermoplastic polyurethane obtained or obtainable by a method for producing a thermoplastic polyurethane that comprises the following steps:
    (i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
    (ii) producing pellets from the melt obtained as per step (i).
20. A thermoplastic polyurethane obtained or obtainable by a method for producing a thermoplastic polyurethane that comprises the following steps:
    (i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
    (ii) producing pellets from the melt obtained as per step (i);
    (iii) storing the pellets obtained as per step (ii).
21. The thermoplastic polyurethane according to any of embodiments 18 to 20, wherein the thermoplastic polyurethane has a bismuth content in the range from 1 to 200 ppm.
22. The thermoplastic polyurethane according to any of embodiments 18 to 21, wherein the isocyanate composition comprises no isocyanate other than H12MDI.
23. The thermoplastic polyurethane according to any of embodiments 18 to 22, wherein the polyol composition (PZ) comprises at least one polyol selected from the group consisting of polycarbonate diols, polyethers, and polyesters.
24. The thermoplastic polyurethane according to any of embodiments 18 to 23, wherein the polyol composition (PZ) comprises at least one chain extender selected from the group consisting of diols having 2 to 6 carbon atoms.
25. The thermoplastic polyurethane according to any of embodiments 18 to 24, wherein the polyol composition (PZ) comprises butanediol as chain extender.

26. The thermoplastic polyurethane according to any of embodiments 18 to 25, wherein the thermoplastic polyurethane has a Shore hardness in the range from 60 A to 60 D, determined as per DIN 53505.
27. The thermoplastic polyurethane according to any of embodiments 18 to 26, wherein the thermoplastic polyurethane has a molecular weight in the range from 70 000 to 100 000.
28. The use of a thermoplastic polyurethane obtained or obtainable by a method according to any of embodiments 1 to 10, or of a thermoplastic polyurethane according to any of embodiments 11 to 27, for producing films, profiles, cable sheathing, and sheathing of LED strips.
29. A method for producing a thermoplastic polyurethane, comprising the following steps:
    (i) reacting an isocyanate composition at least comprising 4,4'-diisocyanatodicyclohexylmethane (H12MDI) with a polyol composition (PZ) in the presence of a catalyst composition at least comprising a bismuth-containing compound selected from bismuth (tricarboxylate) catalysts, where the carboxyl radicals independently of one another have 6 to 12 carbon atoms, to give a melt;
    (ii) producing pellets from the melt obtained as per step (i);
    (iii) storing the pellets obtained as per step (ii); where reaction continues during the storage as per step (iii).
30. The method according to embodiment 29, wherein the polyol composition (PZ) comprises at least one polyol selected from the group consisting of polycarbonate diols, polyethers, and polyesters.
31. The method according to either of embodiments 29 and 30, wherein the polyol composition (PZ) comprises at least one chain extender selected from the group consisting of diols having 2 to 6 carbon atoms.
32. The method according to any of embodiments 29 to 31, wherein the catalyst composition is used in an amount of 50 to 600 ppm, based on the total amount of the components used.
33. The method according to any of embodiments 29 to 32, wherein the catalyst composition comprises bismuth neodecanoate.
34. The method according to any of embodiments 29 to 33, wherein the reaction as per step (i) takes place in an extruder.
35. The method according to any of embodiments 29 to 34, wherein the residence time in the extruder is selected such that a conversion of at least 98% is achieved.
36. The method according to any of embodiments 29 to 35, wherein the production as per step (ii) takes place by means of underwater pelletizing or strand pelletizing.
37. A thermoplastic polyurethane based on an isocyanate composition at least comprising 4,4'-diisocyanatodicyclohexylmethane (H12MDI) and on a polyol composition (PZ) at least comprising a polyol and a chain extender selected from the group consisting of diols having 2 to 6 carbon atoms,
    where the thermoplastic polyurethane has a bismuth content in the range from 1 to 200 ppm.
38. The thermoplastic polyurethane according to embodiment 37, wherein the isocyanate composition comprises no isocyanate other than H12MDI.
39. A thermoplastic polyurethane obtained or obtainable by a method according to any of embodiments 29 to 36.
40. The use of a thermoplastic polyurethane obtained or obtainable by a method according to any of embodiments 29 to 36, or of a thermoplastic polyurethane according to any of embodiments 37 to 39, for producing films, profiles, cable sheathing, and sheathing of LED strips.

The examples which follow serve to illustrate the invention, but are in no way limiting for the subject matter of the present invention.

EXAMPLES

1. Starting Materials

SDO: metal catalyst 93690, tin bis(2-ethylhexanoate), CAS number: 301-10-0, BASF Polyurethanes GmbH, 49440 Lemfoerde, GERMANY.
DBTL: dibutyltin dilaurate, CAS 77-58-7, Sigma-Aldrich Chemie GmbH, Riedstrasse 2, D-89555 Steinheim.
DBTA: dibutyltin acetate for synthesis, CAS 1067-33-0, Sigma-Aldrich Chemie GmbH, Riedstrasse 2, D-89555 Steinheim.
Bicat 4130M: zirconium neodecanoate, CAS 51601-43-5, Shepherd Mirecourt S.A.R.L., Rue de Lorraine, BP 47—Juvaincourt, FR-88502 Mirecourt Cedex, France.
Bicat ZM: zinc neodecanoate, CAS 27253-28-8, Shepherd Mirecourt S.A.R.L., Rue de Lorraine, BP 47—Juvaincourt, FR-88502 Mirecourt Cedex, France.
Bicat 8124: bismuth neodecanoate, CAS 34364-26-6, Shepherd Mirecourt S.A.R.L., Rue de Lorraine, BP 47—Juvaincourt, FR-88502 Mirecourt Cedex, France.
Poly PTHF® 1000: polytetrahydrofuran 1000, CAS number: 25190-06-1, BASF SE, 67056 Ludwigshafen, GERMANY, Intermediates Division.
1,4-Butanediol: butane-1,4-diol, CAS number: 110-63-4, BASF SE, 67056 Ludwigshafen, GERMANY, Intermediates Division.
1,3-Propanediol: SUSTERRA® PROPANEDIOL, propane-1,3-diol, CAS number: 504-63-2, DuPont Tate & Lyle Bio Products Company, 198 Blair Bend Drive, Loudon TN 37774, USA.
Vestanat® $H_{12}$MDI: 4,4'-diisocyanatodicyclohexylmethane, CAS 5124-30-1, Evonik Degussa GmbH, Coatings & Adhesives, D-45765 Marl.
Irganox® 245 FF: ethylenebis(oxyethylene)bis[3-(5-tert-butyl-4-hydroxy-m-tolyl)propionate], CAS number: 36443-68-2, BASF SE, 67056 Ludwigshafen, GERMANY, Antioxidants/Process Stabilizers.

2. Formulations

TABLE 1

Formulations

|  | TPU A | TPU B | TPU C |
|---|---|---|---|
| PolyTHF® 1000 [g] | 1365.6 | 1264.1 | 1365.6 |
| Vestanat® $H_{12}$MDI [g] | 931.7 | 1001.4 | 940.9 |
| 1,4-Butanediol [g] | 191.2 | 134.0 | 191.2 |
| 1,3-Propanediol [g] |  | 75.5 |  |
| Irganox® 245 FF [g] | 10 | 5.0 | 10 |

3. Method Description, Reactive Extruder

The aforementioned starting components were mixed, and the reactive species were reacted, in the case of the reactive extrusion, in self-cleaning twin-screw extruders, by the method described in EP1846465B1 or EP1213307B1. The apparatus selected here for reacting the reaction mixture was a twin-screw extruder having a ratio of screw length to screw diameter of 56. After a residence time in the reactive extruder of at least 40 seconds, preferably greater than 60 seconds, the polyaddition of the isocyanate-containing compounds with the isocyanate-reactive compounds produces a polymer melt whose viscosity is high enough to allow it to be processed to pellets by means of underwater or strand pelletization.

4. Determination of Weight-Average Molecular Weights

The weight-average molecular weights Mw of the thermoplastic polyurethanes are determined for the purposes of the present invention by means of GPC. The molecular weight is determined according to Example 1 (two GPC columns connected in series: PSS Gel; 100 A; 5μ; 300*8 mm, Jordi-Gel DVB; mixed bed; 5μ; 250*10 mm; column temperature 60° C.; flow rate 1 mL/min; RI detector). Calibration here takes place using polymethyl methacrylate (EasyCal; from PSS, Mainz), and the mobile phase used is dimethylformamide.

5. Examples 5.1 Mixture TPU A was prepared in a reactive extruder process using the catalysts DBTL, DBTA, and SDO. All three experiments were produced in the same reactive extruder at the same temperatures, screw speeds, and throughputs. The results are compiled in Table 2.

With the organotin catalysts DBTL, DBTA, and SDO, a good buildup of molecular weight can be achieved during the short residence time in the reactive extruder.

Following the underwater pelletizing, the buildup of molecular weight is faster with the organotin compounds DBTL and DBTA.

These highly efficient organotin catalysts DBTL and DBTA, however, are undesirable in the TPU on account of their toxicity.

TABLE 2

|  | Catalysis ppm | Mw fresh | Mw 2 weeks/45° C. |
|---|---|---|---|
| DBTL dibutyltin dilaurate | 100 ppm | 46 000 | 102 000 |
| DBTA dibutyltin diacetate | 100 ppm | 47 000 | 77 000 |
| SDO Sn dioctoate | 300 ppm | 40 000 | 48 000 |

5.2 Mixture TPU B was prepared by a reactive extruder process using the catalysts SDO, Bicat 4130M, Bicat ZM, and Bicat 8124. All four experiments were produced in the same reactive extruder at the same temperatures, screw speeds, and throughputs.

With the catalysts Bicat ZM, Bicat 8124, and SDO, it is possible to achieve a good buildup in molecular weight during the short residence time in the reactive extruder. This is not the case when using Bicat 4130M.

It was found that the pellets obtained when using the Bicat ZM catalyst have very high yellowness indices. The use of SDO and Bicat 8124 leads to pellets having acceptable yellowness indices of <5. The yellowness index is determined according to ASTM E 313.

Following underwater pelletizing, the buildup of molecular weight is quicker when using Bicat 8124. The results are compiled in Table 3.

TABLE 3

|  | Catalysis [ppm] | Mw fresh | Yellowness Index [YI] | Mw 4 weeks/ 23° C. |
|---|---|---|---|---|
| SDO Sn dioctoate | 250 | 43 000 | <5 | 58 000 |
| Bicat 4130M Zr neodecanoate | 500 | <10 000 | n.d. | n.d. |
| Bicat ZM Zn neodecanoate | 100 | 48 000 | 110 | n.d. |
| Bicat 8124 Bi(III) neodecanoate | 100 | 51 000 | <5 | 89 000 |

5.3 Mixture TPU C was prepared by a reactive extruder process using the catalysts SDO, TBOT and Bicat 8124. All three experiments were produced in the same reactive extruder at the same temperatures, screw speeds, and throughputs.

With the catalysts SDO, TBOT, and Bicat 8124, it is possible to achieve a good buildup in molecular weight during the short residence time in the reactive extruder.

Following underwater pelletizing, the buildup of molecular weight is quicker when using Bicat 8124. The results are compiled in Table 4.

TABLE 4

|  | Catalyse [ppm] | Mw fresh | Yellowness Index [YI] | Mw 20 hours/ 80° C. |
|---|---|---|---|---|
| SDO Sn dioctoate | 300 | 42 000 | <5 | 53 000 |
| TBOT tetrabutylorthotitanate | 200 | 40 000 | 10 | 50 000 |
| Bicat 8124 bi(III) neodecanoate | 400 | 49 000 | <5 | 88 000 |

The invention claimed is:

1. A method for producing a thermoplastic polyurethane, the method comprising:
   (i) reacting an isocyanate composition comprising 4,4'-diisocyanatodicyclohexyl-methane (H12MDI) with a polyol composition (PZ) in a presence of a catalyst composition comprising a bismuth-containing compound selected from at least one bismuth (tricarboxylate) catalyst, where carboxyl radicals independently of one another have 6 to 12 carbon atoms, to give a melt; wherein no isocyanate is used other than H12MDI;
   (ii) producing pellets from the melt obtained in (i); and
   (iii) storing the pellets obtained in (ii),
   wherein a catalytically accelerated reaction continues during the storing (iii) and
   wherein the pellets are produced in (ii) by underwater pelletizing or strand pelletizing.

2. The method according to claim 1, wherein the polyol composition (PZ) comprises at least one polyol selected from the group consisting of a polycarbonate diol, a polyether and a polyester.

3. The method according to claim 1, wherein the polyol composition (PZ) comprises at least one chain extender selected from the group consisting of diols having 2 to 6 carbon atoms.

4. The method according to claim 1, wherein the reacting (i) includes 50 to 600 ppm of the catalyst composition, based on a total amount of components present in the reacting (i).

5. The method according to claim 1, wherein the catalyst composition comprises bismuth neodecanoate.

6. The method according to claim 1, wherein the reacting (i) takes place in an extruder.

7. The method according to claim 6, wherein a residence time in the extruder is such that a conversion of at least 98% is achieved.

8. A thermoplastic polyurethane pellet based on an isocyanate composition comprising 4,4'-diisocyanatodicyclohexylmethane (H12MDI) and on a polyol composition (PZ) comprising a polyol and a chain extender selected from the group consisting of diols having 2 to 6 carbon atoms, the TPU pellet has a bismuth content of 1 to 200 ppm and is capable of undergoing a catalytically accelerated reaction during storage, wherein the isocyanate composition comprises no isocyanate other than the 4,4'-diisocyanatodicyclohexylmethane (H12MDI) and produced with underwater pelletizing or strand pelletizing.

9. A thermoplastic polyurethane pellet obtained by the method according to claim 1.

10. The thermoplastic polyurethane pellet according to claim 8, wherein the thermoplastic polyurethane is comprised in a film.

11. The method according to claim 1, wherein the pellets are produced in (ii) by underwater pelletizing.

12. The method according to claim 1, wherein the pellets have a yellowness indices of <5, wherein the yellowness index is determined according to ASTM E313.

13. The method according to claim 1, wherein the molecular weight buildup is 88,000 after 20 hours at 80° C.

14. The method according to claim 1, wherein the catalyst is selected from the group consisting of bismuth tri(2-ethylhexanoate), bismuth octoate, bismuth neodecanoate, or a combination thereof.

15. The thermoplastic polyurethane pellet according to claim 8, wherein said thermoplastic polyurethane is prepared with a catalyst that is at least one bismuth (tricarboxylate).

16. The thermoplastic polyurethane pellet according to claim 15, wherein said catalyst is selected from the group consisting of bismuth tri(2-ethylhexanoate), bismuth octoate, bismuth neodecanoate, or a combination thereof.

* * * * *